(12) United States Patent
Yoshida et al.

(10) Patent No.: US 6,691,740 B2
(45) Date of Patent: Feb. 17, 2004

(54) SELF-HOLDING TYPE SOLENOID-OPERATED VALVE

(75) Inventors: Masami Yoshida, Ryugasaki (JP); Noriya Sasaki, Kasukabe (JP); Masato Hosoi, Kitasoma-gun (JP)

(73) Assignee: SMC Kabushiki Kaisha, Tokyo (JP)

(*) Notice: Subject to any disclaimer, the term of this patent is extended or adjusted under 35 U.S.C. 154(b) by 0 days.

(21) Appl. No.: 10/023,640

(22) Filed: Dec. 21, 2001

(65) Prior Publication Data

US 2002/0079005 A1 Jun. 27, 2002

(30) Foreign Application Priority Data

Dec. 25, 2000 (JP) ........................................ 2000-392023

(51) Int. Cl.[7] ........................... F15B 13/044; F16K 31/08
(52) U.S. Cl. ................................... 137/625.65; 251/65
(58) Field of Search ....................... 137/625.65; 251/65

(56) References Cited

U.S. PATENT DOCUMENTS 4,548,047 A   10/1985  Hayashi et al.
4,896,127 A * 1/1990   Hida ........................... 335/239
4,967,996 A * 11/1990  Sonoda et al. ............. 251/129.15
5,584,466 A * 12/1996  Fukano et al. ................. 251/65
5,655,747 A * 8/1997   Pasut ............................ 251/65

FOREIGN PATENT DOCUMENTS

| EP | 0 349 159 | 1/1990 |
| EP | 0 650 002 | 4/1995 |
| EP | 0 717 220 | 6/1996 |
| JP | 55-128803 | * 10/1980 |
| JP | 58-081278 | 5/1983 |
| JP | 63-297883 | 12/1988 |
| JP | 1-164874  | * 6/1989 |

* cited by examiner

Primary Examiner—Gerald A. Michalsky
(74) Attorney, Agent, or Firm—Paul A. Guss (57) ABSTRACT

A self-holding type solenoid-operated valve comprises a single coil which is wound around a bobbin in one direction, a movable iron core which is disposed coaxially with a fixed iron core, a first spring which urges the movable iron core away from the fixed iron core, and an annular permanent magnet which is installed to a portion at which an end of the fixed iron core and an end of the movable iron core are opposed to one another. The annular permanent magnet partially surrounds the outer circumferential surfaces of the fixed iron core and the movable iron core.

6 Claims, 9 Drawing Sheets

PRIOR ART

FIG. 8

PRIOR ART

FIG. 9

PRIOR ART

SELF-HOLDING TYPE SOLENOID-OPERATED VALVE

BACKGROUND OF THE INVENTION

1. Field of the Invention

The present invention relates to a self-holding type solenoid-operated valve which can increase the attracting force and the holding force for a movable iron core.

2. Description of the Related Art

A solenoid-operated valve has been used for controlling the flow direction of the compressed air by supplying the compressed air to an actuator or discharging the compressed air to the atmospheric air.

Figure 7:
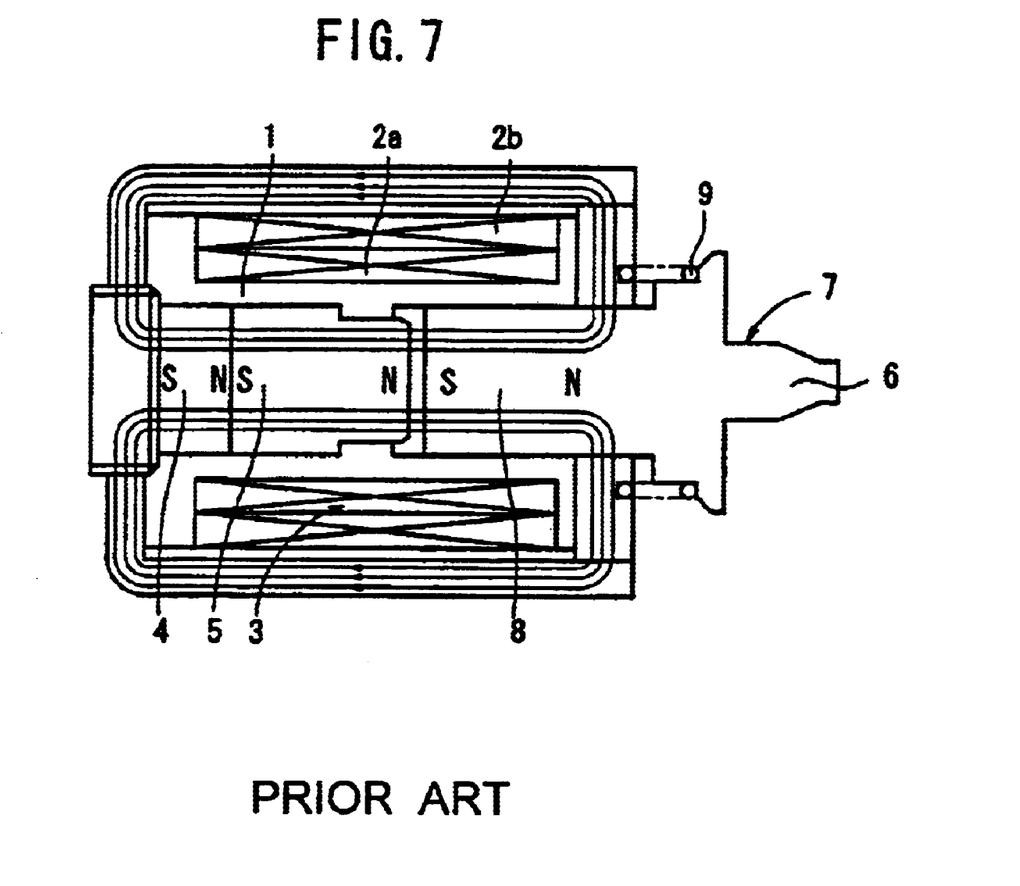
FIG. 7 is a schematic arrangement of a conventional latch type solenoid-operated valve.

A conventional latch type solenoid-operated valve of this type is shown in FIG. 7 (for example, see Japanese Laid-Open Patent Publication No. 63-297883).

The solenoid-operated valve comprises an electromagnetic coil 3 including a valve-switching electromagnetic coil 2a and a valve-restoring electromagnetic coil 2b which are disposed coaxially with a bobbin 1. A permanent magnet 4 is axially disposed on an end of the electromagnetic coil 3. A fixed iron core 5 is disposed coaxially with the permanent magnet 4 in the bobbin 1.

A main valve 7 having a valve stem 6 is disposed on another end of the electromagnetic coil 3 in the direction opposite to the permanent magnet 4. An end of a plunger 8 of a movable iron core is secured to the valve stem 6. Another end of the plunger 8 is inserted displaceably into the center of the electromagnetic coil 3.

The valve stem 6 is urged in the direction opposite to the plunger 8 by a spring 9 which serves as an urging mechanism. The valve stem 6 indirectly urges the plunger 8 toward the direction opposite to the fixed iron core 5.

The operating principle of the conventional latch type solenoid-operated valve thus constructed will now be briefly explained.

FIG. 7 shows a non-excited state in which no current flows through the valve-switching electromagnetic coil 2a and the valve-restoring electromagnetic coil 2b respectively. FIG. 7 also shows an initial position in which the main valve 7 is closed. The plunger 8 is being in the initial position because the spring force (fs) of the spring 9 is larger than the force (F) of the permanent magnet 4.

Figure 8:
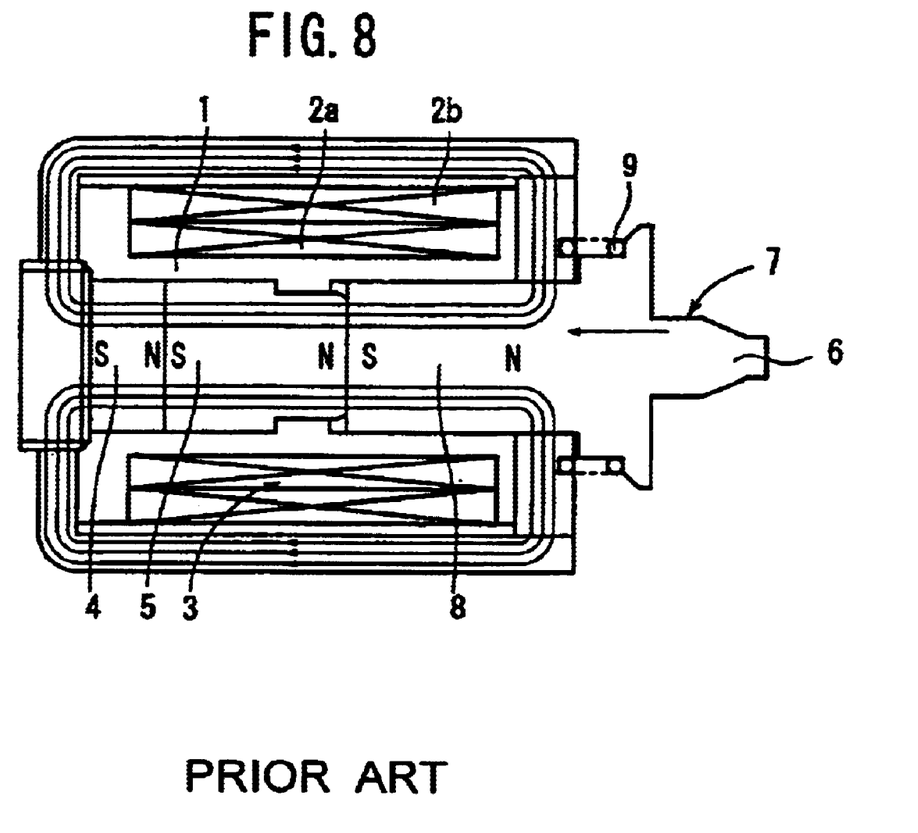
FIG. 8 illustrates the operation of the solenoid-operated valve shown in FIG. 7.

Thereafter, as shown in FIG. 8, when the electric power is applied to the valve-switching electromagnetic coil 2a, the attracting force (fa) of the solenoid is generated by the magnetic excitation of the valve-switching electromagnetic coil 2a. When the force (fa+F) generated by adding the attracting force (fa) to the force (F) of the permanent magnet 4 becomes larger than the spring force (fs) of the spring 9, the plunger 8 is attracted toward the fixed iron core 5. Accordingly, the main valve 7 is opened.

The electric power ceases to be applied to the valve-switching electromagnetic coil 2a with the main valve 7 being opened. Then, the holding force of the permanent magnet 4 is larger than the spring force (fs) of the spring 9. Therefore, the plunger 8 is being attracted toward the fixed iron core 5 even if the electric power ceases to be applied thereto.

Figure 9:
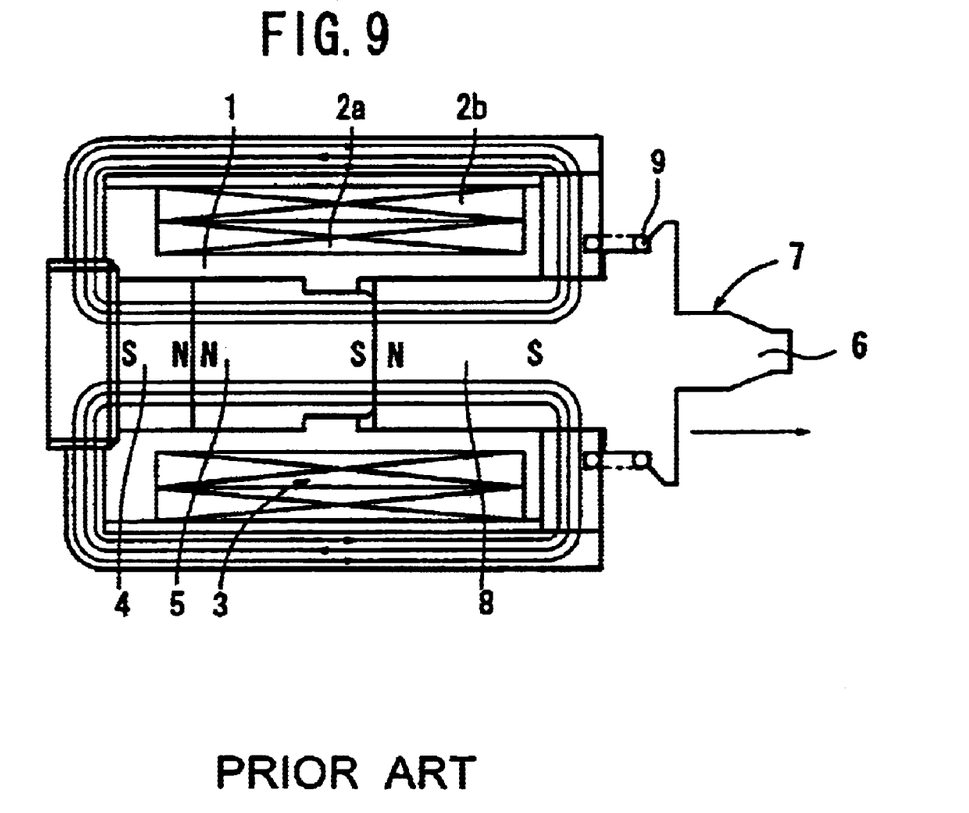
FIG. 9 illustrates the operation of the solenoid-operated valve shown in FIG. 7.

If the electric power is applied to the valve-restoring electromagnetic coil 2b, the attracting force (fb) of the solenoid is generated under the magnetic excitation of the valve-restoring electromagnetic coil 2b. The attracting force (fb) of the solenoid counteracts the holding force of the permanent magnet 4 (see FIG. 9). Therefore, the plunger 8 is restored to the initial position shown in FIG. 7 by the spring force (fs) of the spring 9. Accordingly, the main valve 7 is closed.

However, the conventional latch type solenoid-operated valve requires both of the valve-switching electromagnetic coil 2a for driving the plunger 8 and the valve-restoring electromagnetic coil 2b for releasing the self-holding force of the permanent magnet 4 to restore the plunger 8 to the original position. Therefore, the space occupied by the coil is increased. The entire apparatus of the solenoid-operated valve becomes inevitably large and the production cost becomes expensive.

The permanent magnet 4 is disposed at the axial end of the electromagnetic coil 3 opposite to the plunger 8. When the large holding force is required to retain the plunger 8, the strong magnetic force is required with the large permanent magnet 4. It is also necessary to use the valve-restoring electromagnetic coil 2b for generating the large inverted magnetic force to release the holding force. Accordingly, the consumption of the electric power is increased.

SUMMARY OF THE INVENTION

It is a general object of the present invention to provide a self-holding type solenoid-operated valve which can minimize the entire apparatus and can realize low electric power consumption.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
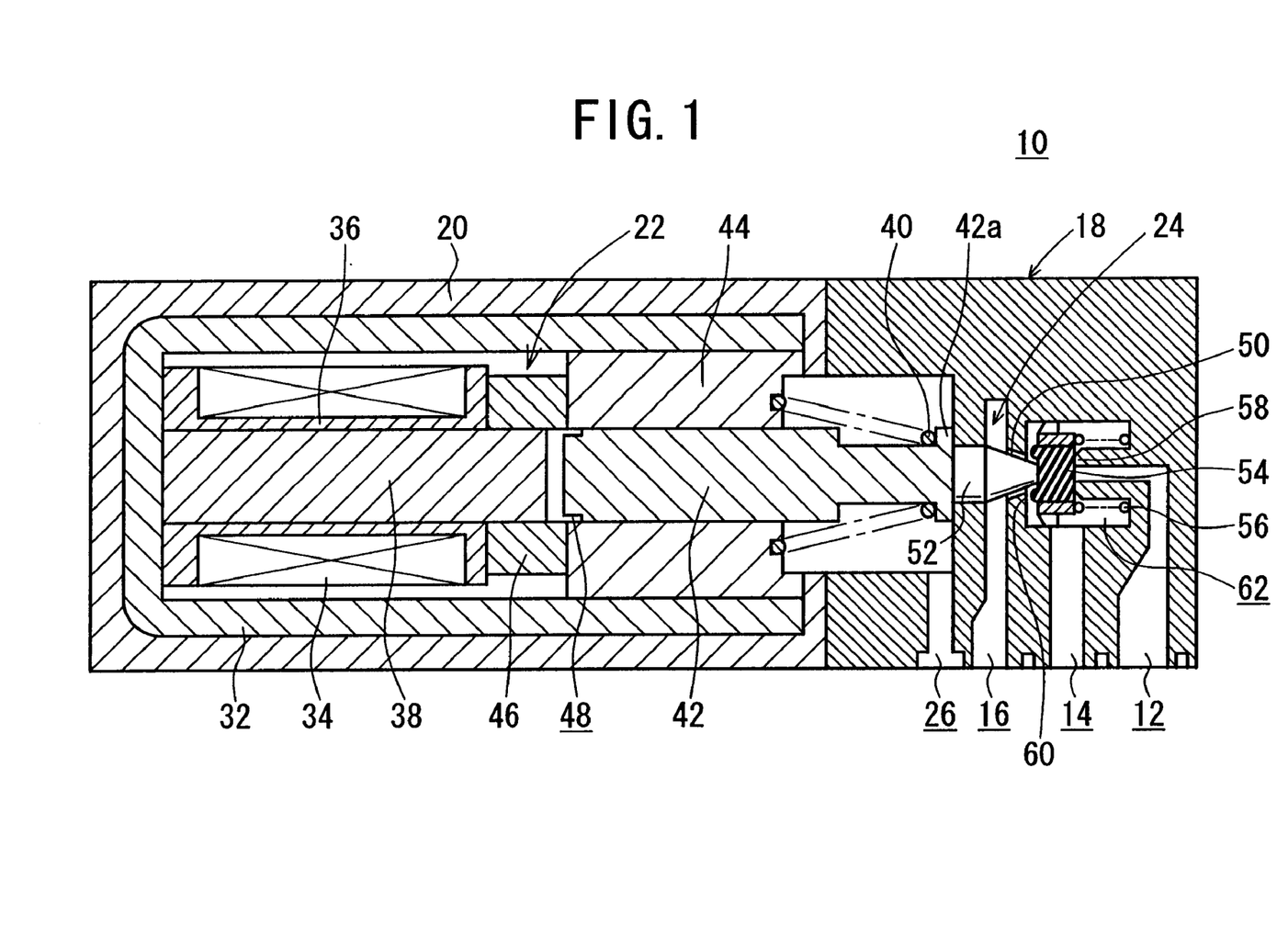
FIG. 1 is a longitudinal sectional view taken along an axial direction of a self-holding type solenoid-operated valve according to an embodiment of the present invention.

In FIG. 1, reference numeral 10 indicates a self-holding type solenoid-operated valve according to an embodiment of the present invention.

The self-holding type solenoid-operated valve 10 comprises a valve body 18, a bottom-equipped bonnet 20 of a cylindrical shape which is integrally connected to a side of the valve body 18, a solenoid 22 which is disposed in the bonnet 20, and a valve mechanism section 24 which switches the communication between the respective ports by the solenoid 22. The valve body 18 includes a pressure fluid supply port 12, a pressure fluid discharge port 14 and a discharge port 16 which are formed on a side of the valve body 18 and which are spaced from each other by predetermined distances.

Reference numeral 26 indicates a respiration port which communicates with the atmospheric air for externally discharging the air of the valve body 18.

The solenoid 22 includes a frame 32, a bobbin 36, a fixed iron core 38 and a movable iron core 42. The frame 32 is internally fitted to the bonnet 20 and is formed by a cylindrical bottom-equipped magnetic member. The bobbin 36 is disposed in the frame 32 and a single coil 34 is wound around the bobbin 36 in a plurality of turns in one direction. The fixed iron core 38 is secured into a penetrating hole defined through the bobbin 36. The movable iron core 42 is disposed coaxially with the fixed iron core 38 and is urged away from the fixed iron core 38 by the resiliency of a first spring 40. An end of the first spring 40 is fastened to an annular projection 42a of the movable iron core 42. Another end of the first spring 40 is fastened to an annular groove of a guide ring 44 as described later on.

The solenoid 22 further includes the guide ring 44 and an annular permanent magnet 46. The guide ring 44 is composed of a non-magnetic member internally fitted to the frame 32. The guide ring 44 surrounds the outer circumferential surface of the movable iron core 42. The annular permanent magnet 46 is installed to a portion at which the end of the fixed iron core 38 and the end of the movable iron core 42 are coaxially opposed to one another. The annular permanent magnet 46 is also installed between the bobbin 36 and the guide ring 44 so as to partially surround outer circumferential surfaces of the fixed iron core 38 and the movable iron core 42.

Figure 2:
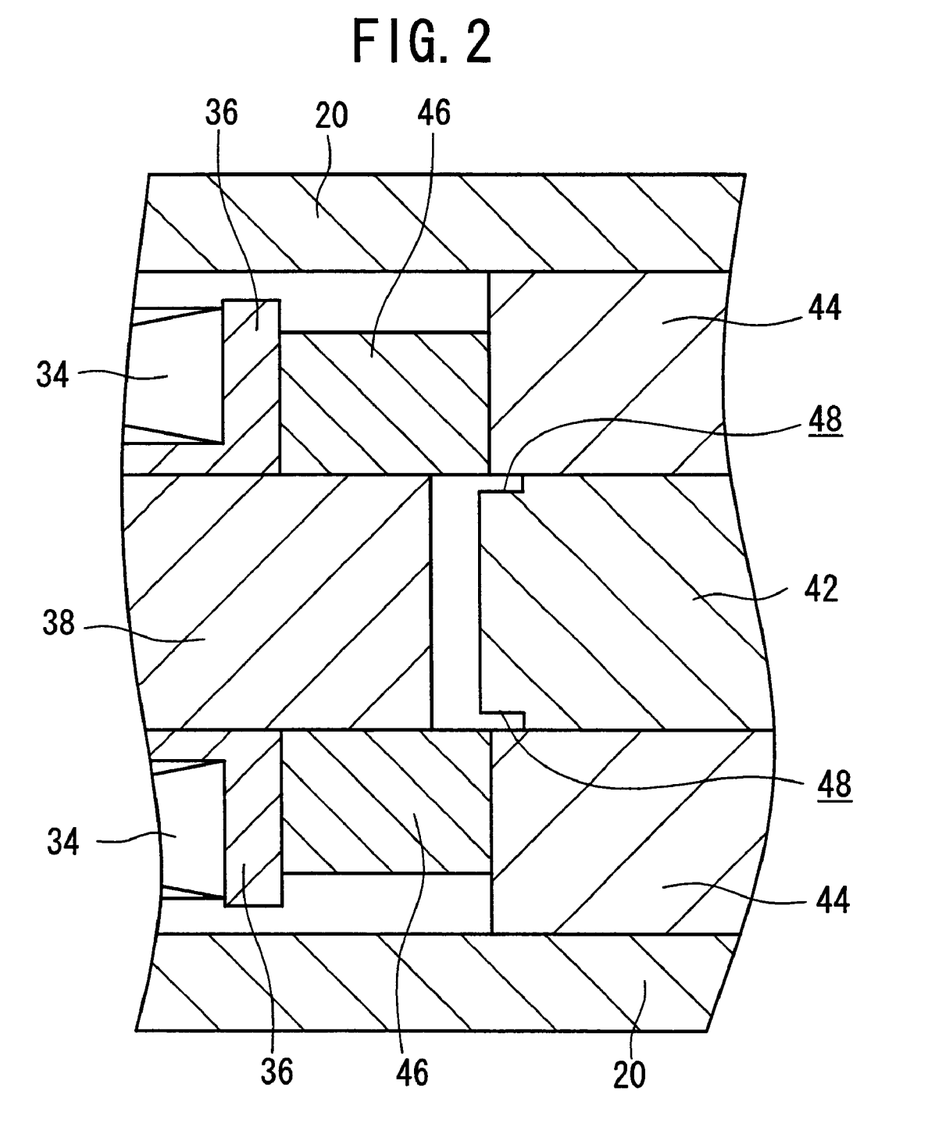
FIG. 2 is a partially magnified longitudinal sectional view of FIG. 1.

An annular recess 48 serving as an air gap extends axially over a predetermined distance on the outer circumferential surface of the end of the movable iron core 42. The movable iron core 42 opposes the end of the fixed iron core 38 (see FIG. 2).

As shown in FIG. 1, the valve mechanism section 24 includes a displacement member 52, a poppet valve 54 and a second spring 56. The displacement member 52 includes a tapered section 50 having the gradually reducing diameter toward the end thereof. The displacement member 52 is axially secured to an end of the movable iron core 42 so as to be displaceable integrally with the movable iron core 42. The tapered section 50 disposed on an end of the displacement member 52 makes abutment against the poppet valve 54. The poppet valve 54 opens and closes the communicating passage between the pressure fluid supply port 12 and the pressure fluid discharge port 14. The second spring 56 presses the poppet valve 54 toward the movable iron core 42.

The poppet valve 54 is away from a first seat 58 so as to communicate the pressure fluid supply port 12 with the pressure fluid discharge port 14. By contrast, the poppet valve 54 is seated on the first seat 58 so as to block the communication between the pressure fluid supply port 12 and the pressure fluid discharge port 14. Further, the poppet valve 54 is away from a second seat 60 opposite to the first seat 58 so as to externally discharge the pressure fluid of a valve chamber 62 via the discharge port 16. By contrast, the poppet valve 54 is seated on the second seat 60 so as to block the above external discharge.

The self-holding type solenoid-operated valve 10 according to the embodiment of the present invention is basically thus constructed. Its operation, function, and effect will now be explained.

Figure 3:
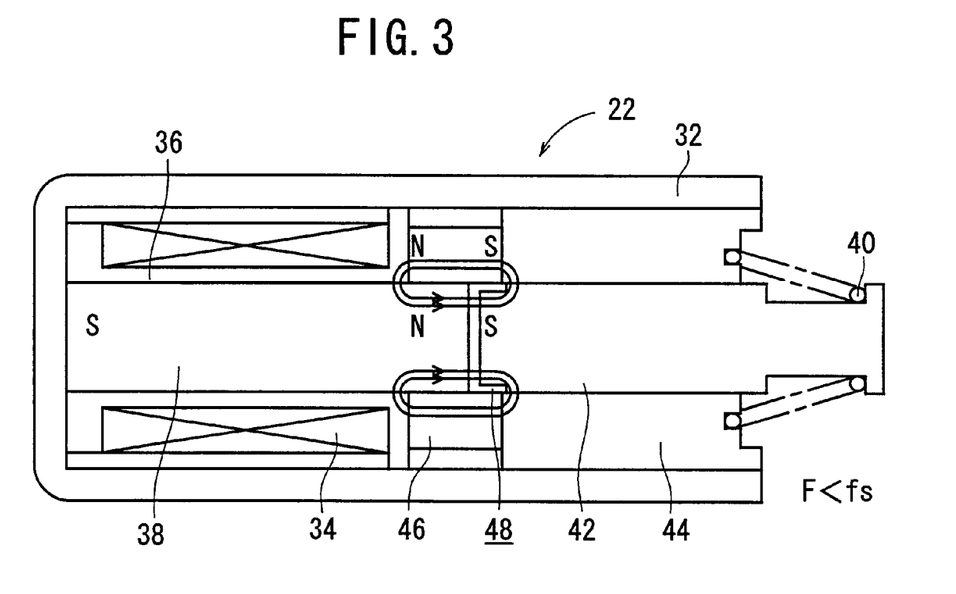
FIG. 3 illustrates an initial state of the self-holding type solenoid-operated valve shown in FIG. 1.

FIG. 3 shows the non-excited state in which no current is supplied to the coil 34. FIG. 3 further shows the OFF state in which the poppet valve 54 is seated on the first seat 58 so as to block the communication between the pressure fluid supply port 12 and the pressure fluid discharge port 14.

Spring constants of the first spring 40 and the second spring 56 are set to seat the poppet valve 54 on the first seat 58 in the OFF state. The spring force (fs) of the first spring 40 exceeds the attracting force (F) of the permanent magnet 46. That is, the relationship F<fs is satisfied in the initial state in which the movable iron core 42 and the fixed iron core 38 are spaced from each other by a predetermined distance and no electric power is applied to the coil 34.

Figure 4:
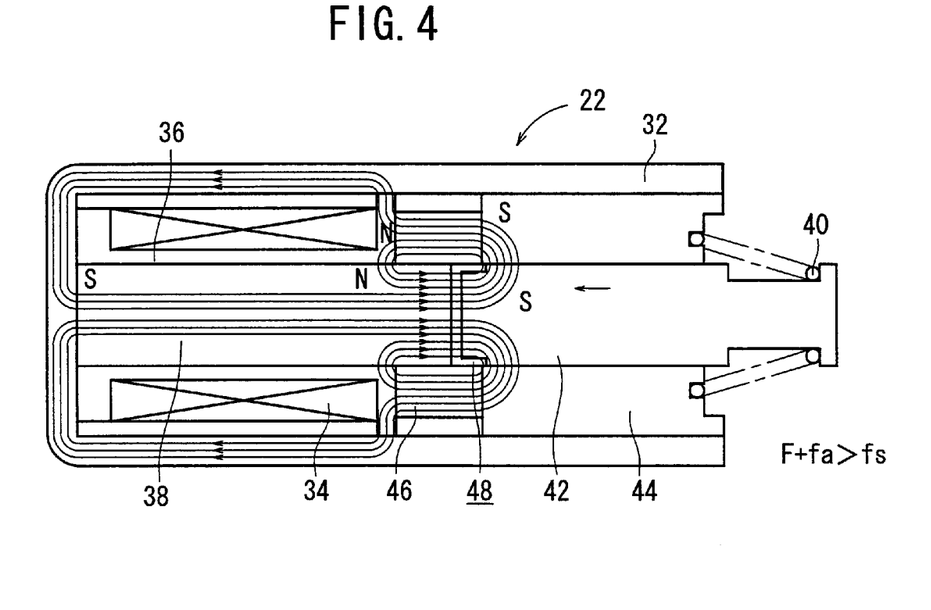
FIG. 4 illustrates a state in which the electric power is applied to a coil in the initial position.

Thereafter, when an unillustrated power source is energized to apply the electric power to the single coil 34, the coil 34 is excited (see FIG. 4). The movable iron core 42 is attracted toward the fixed iron core 38 by the excitation of the coil 34 and the solenoid-operated valve 10 is switched from the OFF state to the ON state.

That is, the movable iron core 42 is slightly displaced toward the fixed iron core 38. The displacement member 52 is moved integrally with the movable iron core 42. Therefore, the movable iron core 42 and the displacement member 52 are displaced against the spring force (fs) of the first spring 40. Further, the poppet valve 54 is away from the first seat 58 by the spring force of the second spring 56. Accordingly, the pressure fluid supply port 12 is communicated with the pressure fluid discharge port 14 in the ON state. The pressure fluid is introduced from the pressure fluid supply port 12 into the valve chamber 62 via the gap between the poppet valve 54 and the first seat 58. The pressure fluid is supplied further to an unillustrated fluid-operated apparatus via the pressure fluid discharge port 14.

In other words, as shown in FIG. 4, if the electric power is applied to the coil 34, the attracting force (fa) of the solenoid is generated by the excitation of the coil 34. When the force (fa+F) generated by adding the attracting force (fa) of the solenoid to the attracting force (F) of the permanent magnet 46 becomes larger than the spring force (fs) of the first spring 40, the movable iron core 42 is attracted toward the fixed iron core 38 so as to open the poppet valve 54.

When the solenoid-operated valve 10 is in the ON state, the upper surface of the poppet valve 54 is seated on the second seat 60 by the resiliency of the second spring 56. The communication is blocked between the valve chamber 62 and the discharge port 16 so as to prevent the pressure fluid from being externally discharged.

Figure 5:
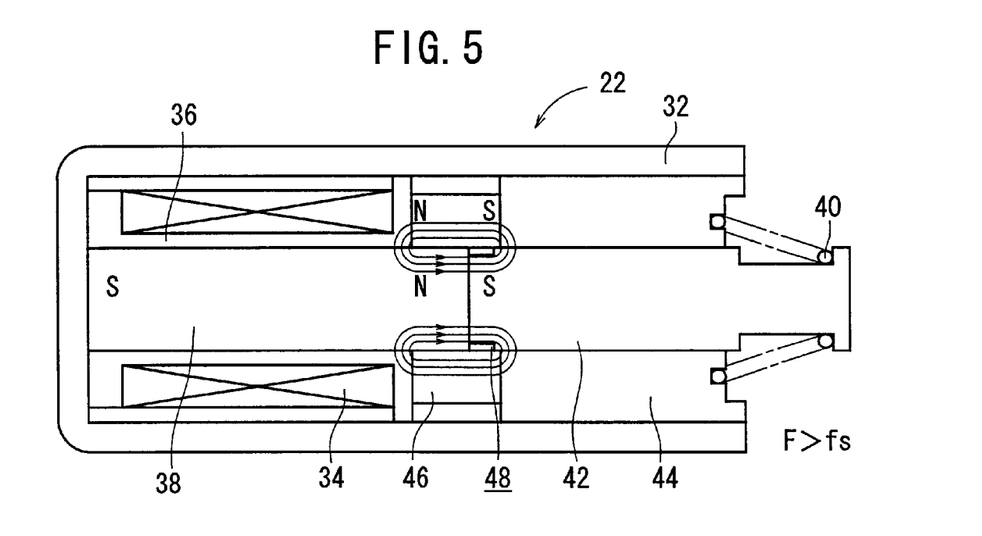
FIG. 5 illustrates a state in which the electric power ceases to be applied to the coil and a fixed iron core holds a movable iron core.

Next, if the electric power ceases to be applied to the coil 34, the movable iron core 42 is kept attracted by the fixed iron core 38 (see FIG. 5). That is, if the electric power ceases to be applied thereto, the attracting force (fa) of the solenoid disappears. However, the attracting force (F) of the permanent magnet 46 for attracting the movable iron core 42 toward the fixed iron core 38 is larger than the spring force (fs) of the first spring 40 (F>fs). Therefore, the movable iron core 42 is kept attracted toward the fixed iron core 38 so as to open the poppet valve 54.

That is, the permanent magnet 46 is installed to the portion at which the end of the fixed iron core 38 and the end of the movable iron core 42 are coaxially opposed to one another. The permanent magnet 46 partially surrounds the outer circumferential surfaces of the fixed iron core 38 and the movable iron core 42. Accordingly, the force of the permanent magnet 46 for holding the movable iron core 42 is improved.

Figure 6:
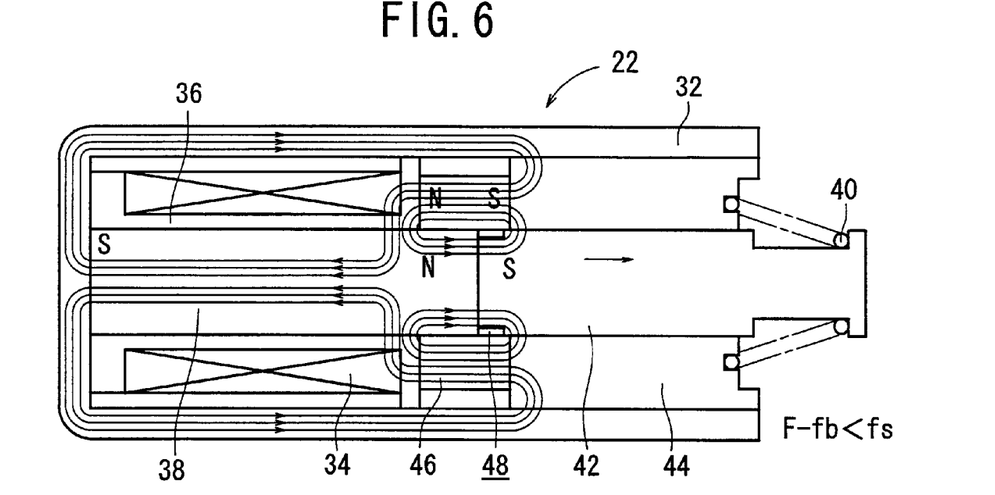
FIG. 6 illustrates a state in which a current having polarity opposite to that used in FIG. 4 flows through the coil in the self-held state.

Next, when the polarity of the current is inverted and the electric power is applied to the coil 34, the attracting force (fb) of the solenoid counteracts the attracting force (F) of the permanent magnet 46 (see FIG. 6).

Therefore, the spring force (fs) of the first spring 40 serving as a restoring spring is larger than the force (F−fb) generated by subtracting the attracting force (fb) of the solenoid from the attracting force (F) of the permanent magnet 46. The movable iron core 42 is displaced away from the fixed iron core 38 by the resiliency of the first spring 40. The displacement member 52 is displaced integrally with the movable iron core 42 and the end of the displacement member 52 presses the poppet valve 54. Accordingly, the poppet valve 54 is seated on the first seat 58 in the OFF state.

In the embodiment of the present invention, the permanent magnet 46 is installed between the bobbin 36 and the guide ring 44. The permanent magnet 46 is also installed to the portion at which the end of the fixed iron core 38 and the end of the movable iron core 42 are coaxially opposed to one another. Therefore, the permanent magnet 46 partially surrounds the outer circumferential surfaces of the fixed iron core 38 and the movable iron core 42. Accordingly, the holding force is larger than the conventional permanent magnet 4 disposed at the axial end of the electromagnetic coil 3 opposite to the plunger 8. In the embodiment of the present invention, further, even if the large holding force is required, the consumption of the electric power is not increased. Accordingly, the energy can be saved.

In the embodiment of the present invention, the single coil 34 wound in one direction is used. The space occupied by the coil 34 is reduced as compared with the conventional two coils of the valve-switching electromagnetic coil 2a and the valve-restoring electromagnetic coil 2b. The entire apparatus of the self-holding type solenoid-operated valve 10 can be minimized and the production cost thereof can be reduced.

In the embodiment of the present invention, the annular recess 48 serving as the air gap is defined on the outer circumferential surface of the end of the movable iron core 42 opposed to the fixed iron core 38. The magnetic force of the permanent magnet 46 can be prevented from acting substantially perpendicular to the axis of the movable iron core 42 if the movable iron core 42 is spaced from the fixed iron core 38 by the predetermined distance in the initial state (see FIG. 3). Further, the self-holding force can be kept strong if the movable iron core 42 is attracted toward the fixed iron core 38 (see FIG. 5).

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A self-holding type solenoid-operated valve for displacing a valve plug by attracting a movable iron core under the magnetic excitation of a solenoid, said self-holding type solenoid-operated valve comprising:

a single coil which is wound in one direction around a bobbin;

a fixed iron core which is secured to a through-hole of said bobbin;

a movable iron core which is disposed coaxially with said fixed iron core;

a spring which urges said movable iron core away from said fixed iron core; and an annular permanent magnet which partially surrounds outer circumferential surfaces of said fixed iron core and said movable iron core, wherein said permanent magnet is installed to a portion at which an end of said fixed iron core and an end of said movable iron core are opposed to one another, and wherein an annular recess defining an air gap is formed on an external circumferential surface at said end of said movable iron core that opposes said fixed iron core, such that said air gap exists when said movable iron core and said fixed iron core are in abutment, for maintaining self-holding of said movable iron core in a state in which said movable iron core is attracted to said fixed iron core and when electric current supplied to said coil is halted.

2. The self-holding type solenoid-operated valve according to claim 1, wherein a valve body has a valve mechanism section disposed therein which includes said valve plug displaceable together with said movable iron core, and said valve plug is away from a first seat so as to communicate a pressure fluid supply port with a pressure fluid discharge port, while said valve plug is away from a second seat so as to communicate said pressure fluid discharge port with a discharge port.

3. The self-holding type solenoid-operated valve according to claim 1, wherein a spring force of said spring is larger than an attracting force of said permanent magnet if no electric power is applied to said coil in an initial state.

4. The self-holding type solenoid-operated valve according to claim 3, wherein an attracting force of said solenoid is generated if electric power is applied to said coil so that said solenoid-operated valve may be in an ON state, and a force is larger than said spring force of said spring, said force being generated by adding said attracting force of said solenoid to said attracting force of said permanent magnet.

5. The self-holding type solenoid-operated valve according to claim 4, wherein said attracting force of said permanent magnet is larger than said spring force of said spring if said electric power ceases to be applied to said coil after said solenoid-operated valve is in said ON state.

6. The self-holding type solenoid-operated valve according to claim 5, wherein-said spring force of said spring is larger than a force if electric power having inverted polarity of current is applied to said coil after said electric power ceases to be applied to said coil, said force being generated by subtracting said attracting force of said solenoid from said attracting force of said permanent magnet.

* * * * *